(12) United States Patent
Bose et al.

(10) Patent No.: US 8,751,675 B2
(45) Date of Patent: Jun. 10, 2014

(54) RACK SERVER MANAGEMENT

(75) Inventors: Sriranjan Bose, Bangalore (IN);
Gururaja Nittur, Karnataka (IN);
Chidananda Satya Kumar Patchava,
Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 412 days.

(21) Appl. No.: 13/165,024

(22) Filed: Jun. 21, 2011

(65) Prior Publication Data
US 2012/0331119 A1  Dec. 27, 2012

(51) Int. Cl.
*G06F 15/16* (2006.01)

(52) U.S. Cl.
USPC .......... 709/230; 709/223; 709/220; 370/254; 370/466; 726/14

(58) Field of Classification Search
USPC .............. 709/220–223; 726/13; 370/254–256
See application file for complete search history.

(56) References Cited

U.S. PATENT DOCUMENTS

| 6,952,428 | B1 * | 10/2005 | Necka et al. .................. 370/466 |
| 8,260,902 | B1 * | 9/2012 | DeGraaf et al. .............. 709/223 |
| 2006/0114835 | A1 * | 6/2006 | Horoschak et al. ........... 370/252 |
| 2008/0086768 | A1 * | 4/2008 | Mirza-Baig ..................... 726/13 |
| 2008/0092213 | A1 | 4/2008 | Wei et al. |

\* cited by examiner

*Primary Examiner* — Abdullahi Salad
(74) *Attorney, Agent, or Firm* — Patterson & Sheridan, LLP

(57) ABSTRACT

Techniques presented herein provide approaches for managing rack servers. In one embodiment, a message is received from a management controller of a rack server and via a switch port, where the message requests a lease for a network address under a first protocol. Upon determining that the management controller is a supported device, the switch port is configured to allow network traffic under at least a second protocol.

20 Claims, 4 Drawing Sheets

RACK SERVER MANAGEMENT

TECHNICAL FIELD

Embodiments presented in this disclosure generally relate to techniques for managing rack servers and, more particularly, to techniques for establishing communication between a management application and one or more rack servers.

BACKGROUND

As the number of computer servers used by businesses has substantially increased, a number of techniques have been developed to remotely manage the operation of such servers. For example, large data centers are frequently managed using a variety of different remote management tools, including, e.g., simple terminal connections, remote desktop applications and sophisticated software tools used to configure, monitor, and troubleshoot both computer hardware and software. The remote management tools are often configured to communicate using one or more standardized protocols.

BRIEF DESCRIPTION OF THE DRAWINGS

To facilitate understanding of embodiments presented in this disclosure, the appended drawings are provided, which illustrate only typical embodiments presented in this disclosure and are therefore not to be considered limiting of its scope, and which are briefly described as follows.

DETAILED DESCRIPTION

Overview

Figure 1:
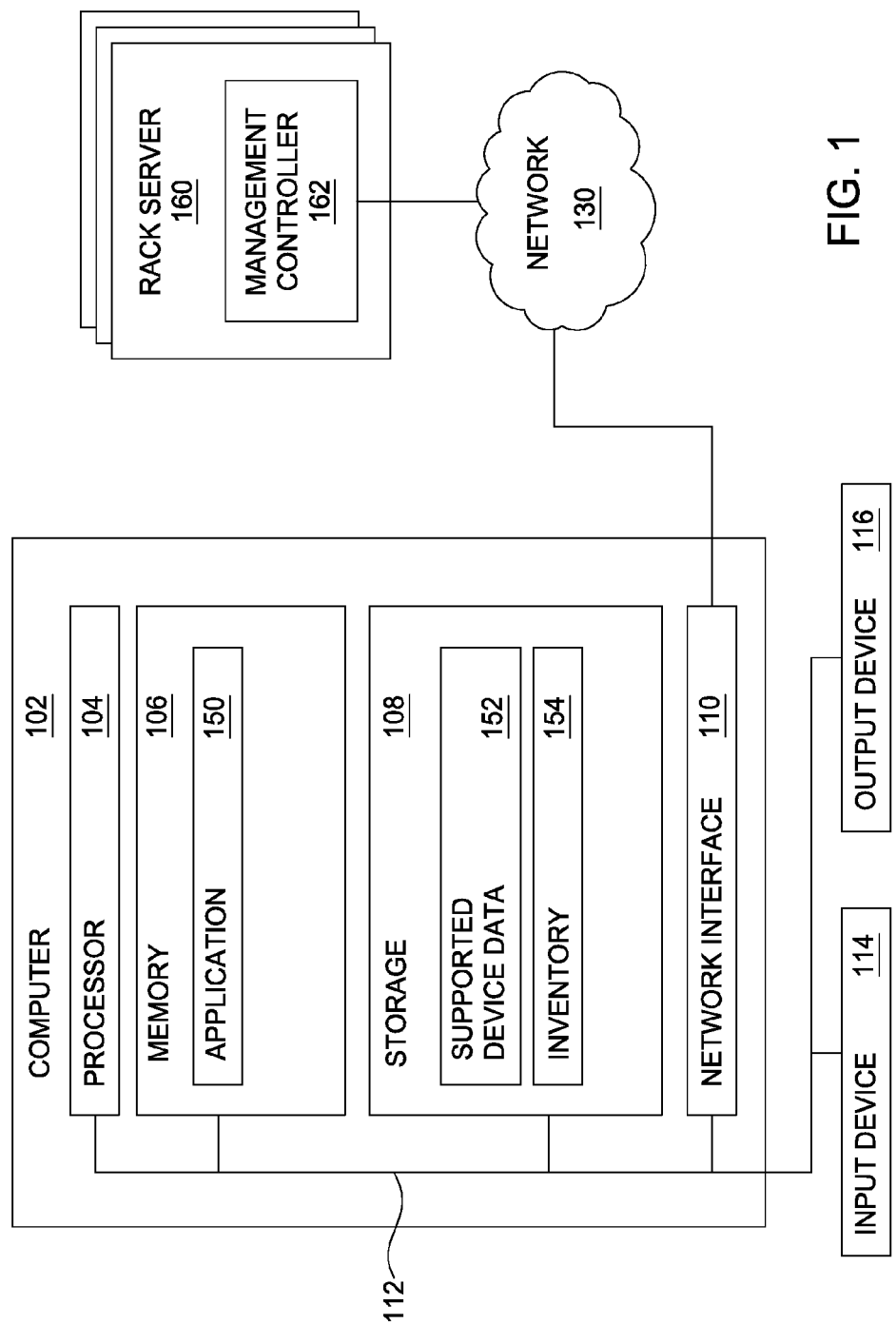
FIG. 1 is a block diagram illustrating a system for managing rack servers, according to one embodiment.

Embodiments presented in this disclosure provide a method, logic encoded in one or more tangible media, and system for performing an operation that includes receiving a message from a management controller of a rack server. The message requests a lease for a network address under a first protocol. Further, the message stores one or more parameters characterizing the management controller in one or more fields defined by the first protocol as being reserved for vendor-specific extensions. Further, the message is received via a switch port configured to allow only network traffic under the first protocol. The operation also includes providing the lease for the network address to the management controller via the switch port. The operation also includes, upon determining that the management controller is a supported device based on the one or more parameters and an indication of one or more supported devices, configuring the switch port to allow network traffic under at least a second protocol.

DESCRIPTION OF EXAMPLE EMBODIMENTS

Embodiments presented in this disclosure provide techniques for managing rack servers. One embodiment provides an application that manages the rack servers by communicating with management controllers in the rack servers using predefined protocols. In this regard, the application and the management controllers may perform operations configured to monitor and control the health and performance of components of the rack servers. The operations may include monitoring elements such as temperatures, voltages, power supplies, fans, bus errors, etc. For example, the application (or management controller) may receive a reading from a temperature sensor indicating that system temperature in a rack server is rising, and in response, send a command to increase fan speed in the rack server. Further, the application may also log the temperature reading. The application (or management controller) may also be configured to detect indications of a failed hardware component and generate an alert when a hardware component fails.

To this end, the management controller may communicate with components of the rack server using messages composed according to the Intelligent Platform Management Interface (IPMI) specification. IPMI refers to monitoring, system control and communication interfaces implemented directly in platform management hardware and firmware (e.g., the hardware and firmware of the host computer). Further, the management controller of the rack server may run on standby power, even when the host processors of the rack server are powered down. Examples of a management controller include a baseboard management controller (BMC) and a lights out management system. Using the techniques disclosed herein, the application identifies, authenticates, authorizes and/or manages the rack servers without requiring any user intervention. Accordingly, the application may manage the rack servers more conveniently and/or efficiently at least in some cases.

FIG. 1 is a block diagram illustrating a system 100 for managing rack servers 160, according to one embodiment. The networked system 100 includes a computer 102. The computer 102 may also be connected via the network 130 to other computers, such as the rack servers 160. Additionally or alternatively, the computer 102 may be connected to one or more blade servers. In general, the network 130 may be telecommunications network and/or a wide area network (WAN). In one embodiment, the network 130 is the Internet.

The computer 102 generally includes a processor 104 connected via a bus 112 to a memory 106, a network interface device 110, a storage 108, an input device 114, and an output device 116. The computer 102 is generally under the control of an operating system. Examples of operating systems include UNIX, versions of the Microsoft Windows® operating system, and distributions of the Linux® operating system. More generally, any operating system supporting the functions disclosed herein may be used. The processor 104 is included to be representative of a single CPU, multiple CPUs, a single CPU having multiple processing cores, and the like. Similarly, the memory 106 may be a random access memory. While the memory 106 is shown as a single identity, it should be understood that the memory 106 may comprise a plurality of modules, and that the memory 106 may exist at multiple levels, from high speed registers and caches to lower speed but larger DRAM chips. The network interface device 110 may be any type of network communications device allowing the computer 102 to communicate with other computers via the network 130.

The storage 108 may be a persistent storage device. Although the storage 108 is shown as a single unit, the storage 108 may be a combination of fixed and/or removable storage devices, such as fixed disc drives, solid state drives, floppy disc drives, tape drives, removable memory cards or optical storage. The memory 106 and the storage 108 may be part of one virtual address space spanning multiple primary and secondary storage devices.

The input device 114 may be any device for providing input to the computer 102. For example, a keyboard and/or a mouse may be used. The output device 116 may be any device for providing output to a user of the computer 102. For example, the output device 116 may be any conventional display screen or set of speakers. Although shown separately from the input device 114, the output device 116 and input device 114 may be combined. For example, a display screen with an integrated touch-screen may be used.

As shown, the memory 106 of the computer 102 includes an application 150, and each rack server 160 includes a respective management controller 162. The application 150 is configured to manage the rack servers 160 by communicating with the management controllers 162 via the network 130, using one or more predefined protocols. The application 150 may also provide a command-line interface (CLI), a graphical user interface (GUI), and/or an application programming interface (API) for managing the rack servers 160. In some embodiments, the computer 102 is configured to provide a switch fabric for the rack servers 160. In this regard, the computer 102 may be configured to provide some or all functionality typically provided by a network switch. As used herein, a switch fabric refers to a network topology where network nodes connect with each other via one or more network switches. In this regard, the computer 102 may be regarded as a fabric interconnect device, or fabric interconnect for short. Further, the storage 108 of the computer 102 stores supported device data 152 and an inventory 154.

In one embodiment, the supported device data 152 characterizes which management controllers 162 are deemed to be valid devices by the application 150. Put another way, the supported device data 152 includes indications of which management controllers 162 are deemed to be valid or supported by the application 150. The supported device data 152 may store one or more fields identifying different devices and/or device types and an associated flag indicating whether each device and/or device type is supported. In one embodiment, a valid or supported device refers to a device that is compatible with the functionality of the application 150 for identifying, authenticating, authorizing and/or managing the rack servers 160 as disclosed herein. The application 150 uses the supported device data 152 in managing the rack servers 160, such as in authorizing and/or authenticating the management controllers 162 of the rack servers 160. For example, the application 150 may compare parameters received from and characterizing the management controller 162 with the fields stored in the supported device data 152, to determine whether the management controller 162 is a supported device. The application 150 also maintains the inventory 154 of the rack servers 160 and/or management controllers 162.

Figure 2:
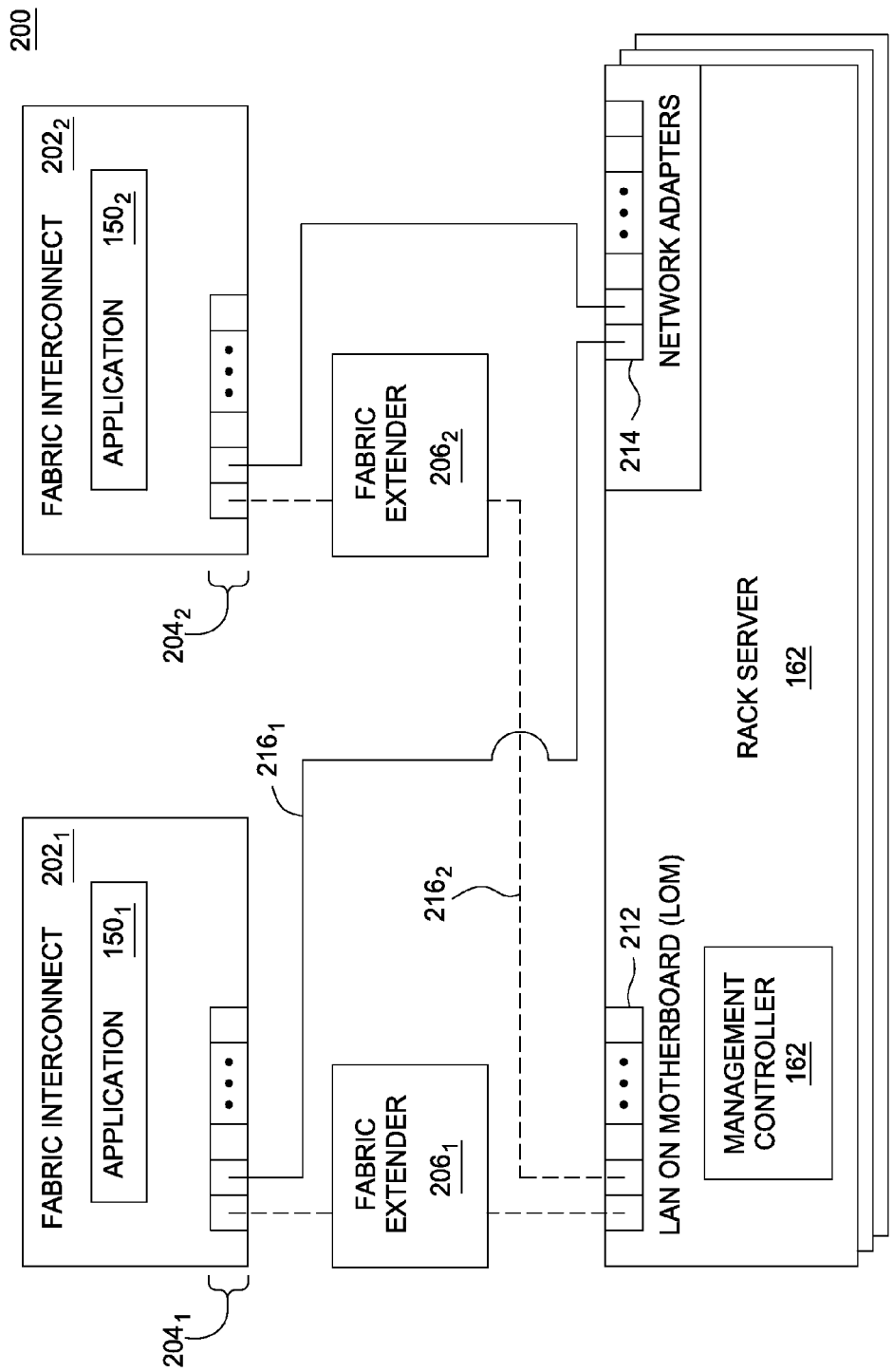
FIG. 2 is a block diagram illustrating a system for managing the rack servers, according to one embodiment.

FIG. 2 is a block diagram illustrating a system 200 for managing the rack servers 160, according to one embodiment. As shown, the networked system 200 includes two fabric interconnects 202, two fabric extenders 206, and the rack servers 160. As shown, the networked system 200 provides an in-band network $216_1$ and an out-of-band network $216_2$. The in-band network $216_1$ provides network connectivity to the rack servers 160, and the out-of-band network $216_2$ is an independent network dedicated for managing components of the rack servers 160, regardless of whether the rack servers 160 are reachable via the in-band network $216_1$. For example, a rack server 160 may not be reachable via in-band network $216_1$ when a problem occurs with a component of the in-band network $216_1$, such as a switch, router or the rack server 160.

In one embodiment, configuring the networked system 200 to include two fabric interconnects 202 and/or two fabric extenders 206 provides redundant network paths for both management traffic and data traffic. Each fabric interconnect 202 corresponds to the computer 102 of FIG. 1. Further, each fabric extender 206 is configured to extend a switch fabric provided by a respective fabric interconnect 202 and may include one or more switch ports. In this regard, each fabric extender 206 serves as remote line cards for an associated fabric interconnect 202. In one embodiment, a line card refers to a card or assembly that contains data interfaces (e.g., optical fibers) and which may be inserted into a network device, such as a switch or router. Each fabric interconnect 202 may also manage configurations of the associated fabric extender 206.

As shown, each rack server 160 is connected to the in-band network $216_1$ via cabling from a network adapter port 214 to a switch port 204 of the fabric interconnect 202. Further, each rack server 160 is connected to the out-of-band network $216_2$ via cabling from a LAN on motherboard (LOM) port 212 to the fabric extender 206 and cabling from the fabric extender 206 to another switch port 204 of the fabric interconnect 202. In an alternative embodiment, each rack server 160 is connected to the out-of-band network $216_2$ via cabling from the LOM port 212 to the fabric interconnect 202 and not through any fabric extender 206. In a particular embodiment, each fabric interconnect 202 may be a Cisco® UCS 6100 series fabric interconnect, each fabric extender 206 may be a Cisco® Nexus 2000 series fabric extender, and the application executing on each fabric interconnect 202 may be a Cisco® Unified Computing System Manager (UCSM).

In one embodiment, each management controller 162 maintains a state, where the state stores an operating mode of the respective management controller 162. Each management controller 162 operates in either a "stand-alone" operating mode or a "UCSM" operating mode. The stand-alone operating mode indicates that the management controller 162 is not currently attempting to parse any commands from the application 150. The UCSM operating mode indicates that the management controller 162 is currently attempting to parse commands from the application 150. The application 150 may instruct the management controller 162 to transition between the two operating modes.

In one embodiment, the application 150 configures each management controller 162 with a respective network address for the out-of-band network $216_2$ using a predefined protocol. Depending on the embodiment, the predefined protocol may either be vendor-specific or vendor-independent. A vendor-independent protocol refers to a protocol that is not specific to any vendor. In one embodiment, each network address is an Internet Protocol (IP) address, and the predefined protocol is Dynamic Host Configuration Protocol (DHCP). Further, the application 150 may also provide a DHCP service for the management controllers 162. Depending on the embodiment, some or all of the functionality of the DHCP service may be provided by a separate program associated with and/or managed by the application 150, and vice versa. By default, each management controller 162 may be configured to send, to the DHCP service, one or more DHCP messages requesting an IP address from the DHCP service. The DHCP messages include a field storing a client identifier. The client identifier may be composed according to a predefined format that is customizable by a vendor of the application 150, to suit the needs of a particular case. Table I shows an example of a predefined format for the client identifier.

TABLE I

Example format for a client identifier in a DHCP message

<VENDOR>|+|<MODEL>|+|<SERIAL>

As shown, the predefined format for the client identifier includes three sub-fields separated by a predefined delimiter ("|+|"). The three sub-fields include a vendor identifier, a model identifier, and a serial identifier. In one embodiment, the application 150 uses the vendor identifier and the model identifier to identify a source of the DHCP messages as a valid device, where the source is a rack server 160 and/or a management controller 162. The application 150 uses the serial identifier to maintain the inventory 154 of identified devices. The inventory 154 is maintained for audit and/or authentication purposes. In particular, the application 150 uses the inventory 154 to associate features and/or configurations to a particular rack server 160. For instance, suppose that a rack server 160, having an associated configuration, is decommissioned for maintenance and is subsequently reconnected to the switch fabric following a maintenance cycle. The application 150 may then identify the rack server 160 and re-associate the configuration with the rack server 160. In some embodiments, the inventory is stored in a database system, and the serial identifier may be used as a unique key in the database system. In other embodiments, the serial identifier is combined with an additional field, such as a product identifier field, to form the unique key.

In one embodiment, the DHCP messages sent by the management controller 162 further contain one or more parameters characterizing the management controller 162. The parameters may be stored in one or more fields that are reserved for vendor-specific extensions. For example, the fields may correspond to one or more options within the range of DHCP options 224-254, which is designated by the DHCP specification as being reserved for vendor-specific extensions.

In one embodiment, the DHCP messages sent by the application 150 and/or DHCP service may also store data in one or more fields that are reserved for vendor-specific extensions. For example, suppose the management controller 162 sends a message requesting DHCP option 251. In response, the application 150 and/or DHCP service sends one or more messages having a field corresponding to DHCP option 251 and storing data in a predefined format, such as shown in Table II.

TABLE II

Example data stored in DHCP option 251 by the application

<ucsmdata version="1 0">
   <action name="change-mode" val="ucsm"/>
   <auth hashval="123" count="23"/>
</ucsmdata>

As shown in Table II, the data stored in DHCP option 251 includes a protocol version, a command and an authentication token. The protocol version specifies a version of the protocol being used by the DHCP server for identifying the management controllers 162. As shown, the protocol version is specified in the <ucsmdata> tag as being version 1.0. The <ucsmdata> tag additionally identifies the DHCP server as the source of the message. The command, specified in an <action> tag, instructs the management controller 162 to transition to the UCSM operating mode. The authentication token is specified in an <auth> tag. Other commands are broadly contemplated. For example, the other commands may specify to reset the management controller 162, to restore a configuration of the management controller 162 to a factory default configuration, etc.

In one embodiment, the management controller 162 parses the data to retrieve the commands, authentication tokens, etc. The management controller 162 may also execute the retrieved commands. In one embodiment, the format for data stored in the DHCP option 251 may be proprietary to a vendor of the application 150 or of the fabric interconnect 202. Because the DHCP specification does not mandate the use of DHCP option 251, applications and/or DHCP services from other vendors will likely either not populate the data or populate the data incorrectly. In such cases, the management controller 162 will not successfully parse any commands from the DHCP option 251.

In one embodiment, the management controllers 162 may respond to messages sent from the DHCP service. For example, the management controllers 162 may send additional messages that store data in one or more options within the range of DHCP options 224-254. The DHCP service may parse the data in the additional messages to complete a process of discovering and/or maintaining an inventory for the rack servers 160.

For example, suppose that the management controller 162 sends a message to the DHCP service, where the message requests to the DHCP service to populate DHCP option 250. Table III shows an example of the message sent to the DHCP service.

TABLE III

Example data stored in DHCP option 250 by the management controller

<bmcdata version "1 0" mode="stand-alone" source="lom">
   <auth hashval="10023" count="67"/>
</bmcdata>

As shown in Table III, the data stored in DHCP option 250 includes a protocol version, an operating mode, a source interface and an authentication token. The protocol version is specified in the <bmcdata> tag as being version 1.0. The <bmcdata> tag additionally identifies the management controller 162 as being the source of the message. The operating mode, specified in the <mode> tag, indicates that the management controller 162 is currently operating in the stand-alone mode. The source interface, specified in the <source> tag, identifies the physical interface being used to connect the rack server 160 to the fabric interconnect 202. In this particular example, the physical interface is the LOM. By configuring the DHCP service according to the techniques disclosed herein, the DHCP service may parse the DHCP option 250 in the message, to retrieve the hash value contained in the message. A DHCP service not so configured will likely ignore the DHCP option 250, without any impact to functionality to the DHCP service. Accordingly, a level of compatibility with other DHCP services is maintained.

In one embodiment, responsive to messages requesting an IP address, the DHCP service provides, to the management controller 162, a lease for the IP address for the out-of-band network $216_2$. Additionally, the DHCP service may also update an entry for the management controller, in the inventory 154. Further, the DHCP service may also monitor a state of the management controller 162 and/or rack server 160. In one embodiment, the duration of a lease may be a predefined number of seconds. Having a relatively short lease duration—such as one of several seconds—results in the management controller 162 requesting a new lease more frequently. Increasing a frequency which a management controller 162 communicates with the DHCP service is advantageous at least in some cases, because doing so allows the management controller 162 to communicate any change of state of the management controller 162 and/or of rack server 160 more frequently.

In one embodiment, the application 150 is further configured to manage the switch ports 204 and/or the switch ports of the fabric extenders 206. To this end, the application 150 may maintain a state for each switch port, where the state is either an "untrusted" state or a "trusted" state. For instance, the application 150 may designate a switch port 204 as being in an untrusted state. In the untrusted state, the switch port 204 is configured to allow only DHCP packets to and/or from the management controller 162. Upon identifying the management controller 162 as a valid device, the application 150 may additionally designate the switch port 204 as being in a trusted state. In the trusted state, the switch port 204 is configured to allow packets of one or more predefined protocols other than DHCP—in addition to allowing DHCP packets to and/or from the management controller 162. The one or more predefined protocols may include Secure Shell (SSH), Telnet, Hypertext Transfer Protocol (HTTP), HTTP Secure (HTTPS), Trivial File Transfer Protocol (TFTP) and Intelligent Platform Management Interface (IPMI), etc.

In some embodiments, in the trusted state, the switch port 204 allows all types of network traffic to and/or from the management controller 162. Once the switch port 204 is in the trusted state, the application 150 may further authenticate and/or authorize the management controller 162 using one or more additional protocols. The additional protocols may be proprietary to the vendor of the application 150 and may be tailored to suit the needs of a particular case. For instance, the application 150 may issue one or more commands via a mctools protocol. The mctools protocol refers to a proprietary protocol configured to support commands such as retrieving sensor readings from the management controller 162, retrieving logs from the management controller 162, executing power operations via the management controller 162, etc.

In one embodiment, the switch port 204 may also revert from a trusted state to an untrusted state. For example, the application 150 may revert the switch port 204 from the trusted state to the untrusted state upon detecting that a user has removed, from the switch fabric, the rack server 160 previously connected to the switch port 204. As another example, the application 150 may revert the switch port 204 from the trusted state to the untrusted state upon detecting an indication that a topology change has occurred in the switch fabric. For instance, the indication may be a port flap for a switch port. Accordingly, by using the techniques disclosed herein, the application 150 may manage the rack servers 160 more securely at least in some cases.

Figure 3:
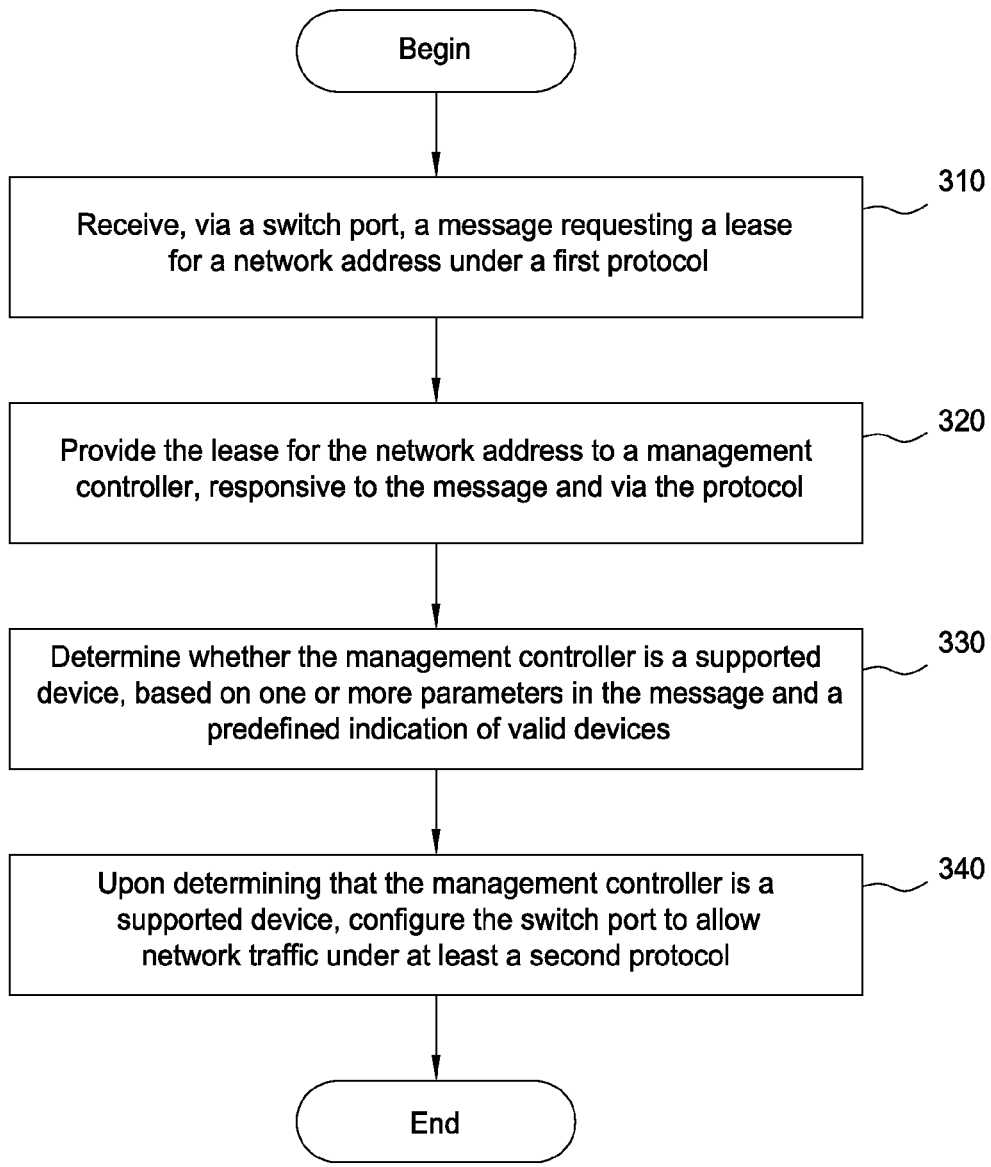
FIG. 3 is a flowchart depicting a method for managing the rack servers, from the perspective of a management application, according to one embodiment.

FIG. 3 is a flowchart depicting a method 300 for managing the rack servers 160, from the perspective of the application 150, according to one embodiment. As shown, the method 300 begins at step 310, where the application 150 receives, via a switch port 204 and from a management controller 162, a message requesting a lease for a network address for the out-of-band network 216₂. The lease may be requested under a predefined protocol defining one or more fields reserved for vendor-specific extensions. In one embodiment, the switch port 204 allows only network traffic using the predefined protocol. Further, the message may store, in the fields reserved for vendor-specific extensions, parameters characterizing the management controller 162.

At step 320, the application 150 provides the management controller 162 with the lease for the network address, responsive to the message and via the predefined protocol. At step 330, the application 150 determines whether the management controller 162 is a valid device, based on one or more of the parameters received in the request (and a predefined set of valid devices). At step 340, upon determining that the management controller 162 is a valid device, the application 150 configures the switch port to further allow network traffic under at least one protocol other than the predefined protocol.

Figure 4:
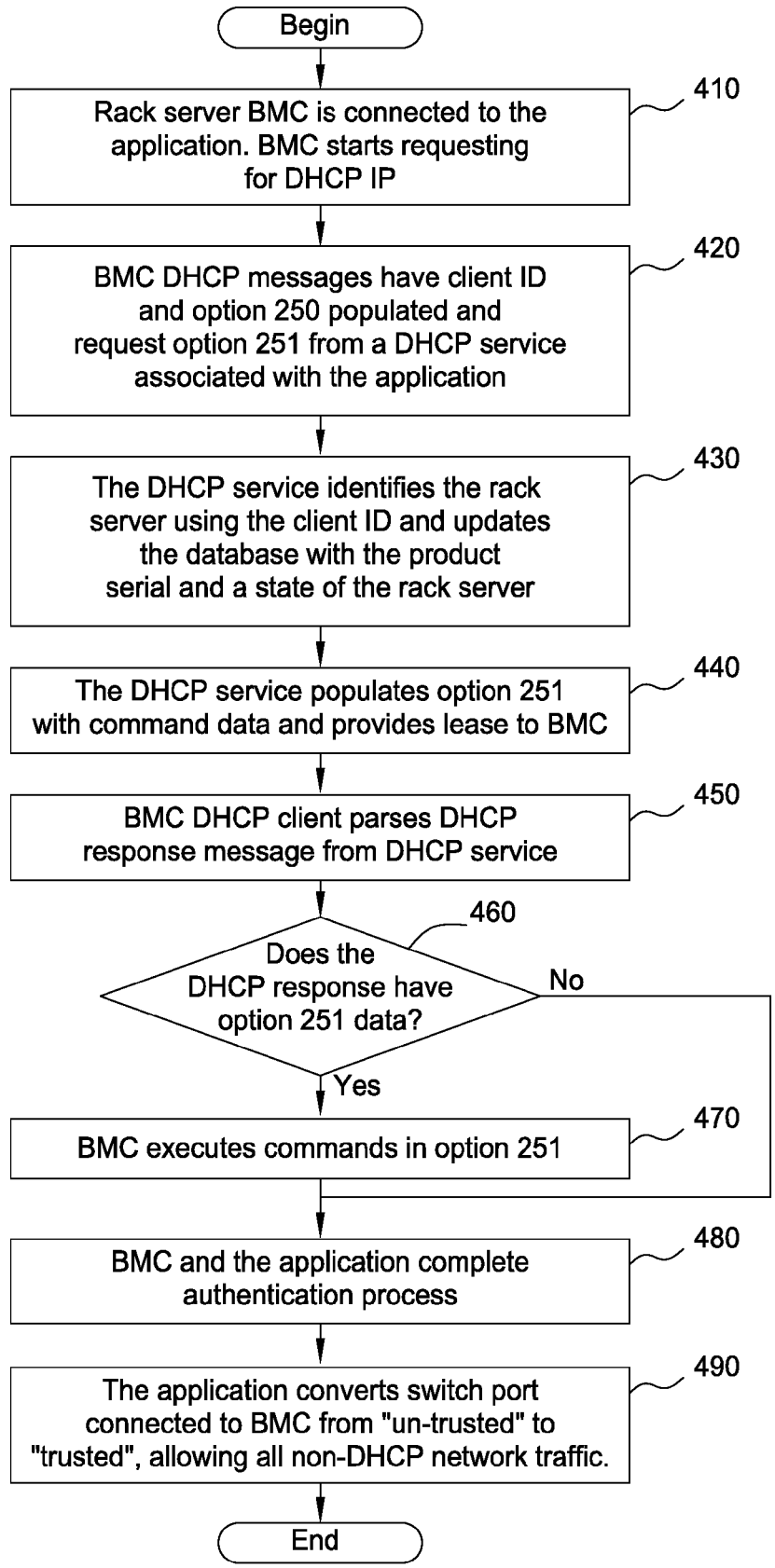
FIG. 4 is a flowchart depicting a method for managing the rack servers, from the perspectives of both the management application and the rack servers, according to one embodiment.

FIG. 4 is a flowchart depicting a method 400 for managing the rack servers 160, from the perspectives of both the application 150 and the rack servers 160, according to one embodiment. As described above, the application 150 provides the DHCP service for the rack servers. As shown, the method 400 begins at step 410, where the management controller 162 of a rack server 160 connects to the DHCP service. At the step 410, the management controller 162 also sends a message to the DHCP service requesting an IP address. The DHCP message may include a client identifier and a populated DHCP option 250. The DHCP message may also request DHCP option 251 from the DHCP service. At step 420, the DHCP service receives the DHCP message.

At step 430, the DHCP service identifies the rack server 160 by using the client identifier and updates the database with a unique key and a state of the management controller 162. At step 440, the DHCP service sends a response message to the management controller 162, to provide a lease to the management controller 162. The response message populates DHCP option 251 with one or more commands. At step 450, the management controller 162 parses the response message from the DHCP service. At step 460, the management controller 162 determines whether the response message includes DHCP option 251 data. If so, the management controller 162 executes the one or more commands in the DHCP option 251 (step 470). Otherwise, at step 480, the management controller 162 and the application 150 complete the authentication process. At step 490, the application 150 converts the switch port 204 connected to the management controller 162 from an untrusted state to a trusted state, allowing other non-DHCP traffic through the switch port 204.

Advantageously, embodiments described above provide approaches for managing rack servers. In one embodiment, an application receives a message from a management controller of a rack server and via a switch port, where the message requests a lease for a network address under a first protocol. Upon determining that the management controller is a valid device, the application configures the switch port to allow network traffic under at least a second protocol. Accordingly, the application may manage the rack servers more conveniently and/or securely at least in some cases.

For example, the rack servers may be managed more conveniently and/or securely, relative to some alternative embodiments, which are further described below. In particular, the application may support automatic discovery of rack servers, relative to such alternative embodiments, where automatic discovery refers to identifying the rack servers without requiring user input and without requiring agents to be installed on the rack servers, when compared to such alternative embodiments. The application may also support asynchronous discovery of rack servers, relative to such alternative embodiments, where asynchronous discovery refers to identifying rack servers being added to the switch fabric, without requiring user input and without requiring agents to be installed on the rack servers. In this regard, the application identifies the rack server without requiring any user intervention or scheduling mechanism. Merely the rack server being added to the switch fabric may be sufficient for prompting the application to identify the rack server, and no other synchronization is required between the application and the operation of adding the rack server to the switch fabric.

An example of one such alternative embodiment includes installing an agent on each rack server, where the agent is a Simple Network Management Protocol (SNMP) agent or a vendor-specific agent. The alternative embodiment may also include having a user provide a range of network addresses in the switch fabric. The alternative embodiment may also include scanning the range of network addresses to identify all rack servers having the agent installed. The alternative embodiment may also include having a user manually provide authentication information for configuring the rack server and the application, such that the rack server may communicate with the application via a secure protocol.

Additionally or alternatively, the application may also manage one or more blade servers in a blade system. In the case of blade servers, however, a fixed relationship may be established between each chassis slot of a blade system and an IP address of a management controller of the blade server disposed within the respective chassis slot. For example, the IP address of the management controller may be determined from a chassis identifier and a slot identifier for the chassis slot in which the blade server is disposed. Accordingly, the IP address of the management controller cannot be changed unless the blade server is moved to a different chassis slot of the blade system. This is in contrast to the rack server environment, where no such relationship exists that establishes the IP address for the management controller. Consequently, the application may manage the blade servers more conveniently than managing the rack servers at least in some cases.

In the preceding, reference is made to embodiments presented in this disclosure. However, it should be understood that the present disclosure is not limited to specific, described embodiments. Instead, any combination of the following features and elements, whether related to different embodiments or not, is contemplated to implement and practice the present disclosure, and moreover the disclosure is to be accorded the widest scope consistent with the principles and features described herein. Furthermore, although embodiments may achieve advantages over other possible solutions and/or over the prior art, whether or not a particular advantage is achieved by a given embodiment is not limiting of the disclosure.

As will be appreciated by one skilled in the art, embodiments presented in this disclosure be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

Further, embodiments may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g., an amount of storage space consumed by a user or a number of virtualized systems instantiated by the user). A user can access any of the resources that reside in the cloud at any time, and from anywhere across the Internet. In context of the present disclosure, the application and/or the management controllers may operate in the cloud. Doing so allows the user to manage execution of the rack servers from any computing system attached to a network connected to the cloud (e.g., the Internet).

The flowchart and block diagrams in the Figures illustrate the architecture, functionality and operation of possible implementations of systems, methods and computer program products according to various embodiments presented in this disclosure. In this regard, each block in the flowchart or block diagrams may represent a module, segment or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

In view of the foregoing, the scope of the present disclosure is determined by the claims that follow.

We claim:
1. A method comprising:
receiving a message from a management controller of a rack server, the message requesting a lease for a network address under a first protocol, the message storing one or more parameters characterizing the management controller in one or more fields defined by the first protocol as being reserved for vendor-specific extensions, and the message being received via a switch port configured to allow only network traffic under the first protocol;
providing the lease for the network address to the management controller via the switch port; and upon determining that the management controller is a supported device based on the one or more parameters and an indication of one or more supported devices, configuring the switch port to allow network traffic under at least a second protocol.

2. The method of claim 1, further comprising:
sending a request to the management controller via the second protocol.

3. The method of claim 2, wherein the request comprises at least one of:
(i) a request for the management controller to undergo further authentication;
(ii) a request for the management controller to execute a specified command; and
(iii) a request for the management controller to retrieve a system parameter.

4. The method of claim 1, wherein the message stores at least one of a vendor field, a model field, and a serial number.

5. The method of claim 4, wherein determining the management controller is supported is based on at least one of the vendor field and the model field, and wherein the serial field is used to uniquely identify the management controller relative to other management controllers.

6. The method of claim 1, wherein the first protocol comprises a vendor-independent protocol, and wherein the second protocol comprises a vendor-specific protocol.

7. The method of claim 1, wherein determining the management controller is a supported device comprises:
comparing the one or more parameters with the indication of one or more supported devices.

8. Logic encoded in one or more non-transitory media for execution and when executed operable to:
receive a message from a management controller of a rack server, the message requesting a lease for a network address under a first protocol, the message storing one or more parameters characterizing the management controller in one or more fields defined by the first protocol as being reserved for vendor-specific extensions, and the message being received via a switch port configured to allow only network traffic under the first protocol;
provide the lease for the network address to the management controller via the switch port; and
upon determining that the management controller is a supported device based on the one or more parameters and an indication of one or more supported devices, configure the switch port to allow network traffic under at least a second protocol.

9. The logic of claim 8, further operable to:
send a request to the management controller via the at least one protocol other than the protocol.

10. The logic of claim 9, wherein the request comprises at least one of:
(i) a request for the management controller to undergo further authentication;
(ii) a request for the management controller to execute a specified command; and
(iii) a request for the management controller to retrieve a system parameter.

11. The logic of claim 8, wherein the message stores at least one of a vendor field, a model field, and a serial number.

12. The logic of claim 11, wherein determining the management controller is supported is based on at least one of the vendor field and the model field, and wherein the serial field is used to uniquely identify the management controller relative to other management controllers.

13. The logic of claim 8, wherein the first protocol comprises a vendor-independent protocol, and wherein the second protocol comprises a vendor-specific protocol.

14. The logic of claim 8, wherein determining the management controller is a supported device comprises:
comparing the one or more parameters with the indication of one or more supported devices.

15. A system comprising:
one or more computer processors;
logic encoded in one or more tangible media for execution and, when executed by the one or more computer processors, operable to:
receive a message from a management controller of a rack server, the message requesting a lease for a network address under a first protocol, the message storing one or more parameters characterizing the management controller in one or more fields defined by the first protocol as being reserved for vendor-specific extensions, and the message being received via a switch port configured to allow only network traffic under the first protocol;
provide the lease for the network address to the management controller via the switch port; and
upon determining that the management controller is a supported device based on the one or more parameters and an indication of one or more supported devices, configure the switch port to allow network traffic under at least a second protocol.

16. The system of claim 15, wherein the logic is further operable to:
send a request to the management controller via the at least one protocol other than the protocol.

17. The system of claim 16, wherein the request comprises at least one of:
(i) a request for the management controller to undergo further authentication;
(ii) a request for the management controller to execute a specified command; and
(iii) a request for the management controller to retrieve a system parameter.

18. The system of claim 15, wherein the message stores at least one of a vendor field, a model field, and a serial number.

19. The system of claim 18, wherein determining the management controller is supported is based on at least one of the vendor field and the model field, and wherein the serial field is used to uniquely identify the management controller relative to other management controllers.

20. The system of claim 15, wherein the first protocol comprises a vendor-independent protocol, and wherein the second protocol comprises a vendor-specific protocol.

* * * * *